United States Patent [19]

Champeau et al.

[11] 4,084,461

[45] Apr. 18, 1978

[54] AUTOMATIC FEED FOR A LATHE

[75] Inventors: Marcel Champeau, Niort; André Tabutin, La Celle-St-Cloud, both of France

[73] Assignee: Societe Ramo S.A., Niort, France

[21] Appl. No.: 781,483

[22] Filed: Mar. 25, 1977

[30] Foreign Application Priority Data

Mar. 31, 1976 France .................... 76 09350

[51] Int. Cl.² .............................................. B23B 3/00
[52] U.S. Cl. .................................................. 82/21 B
[58] Field of Search ...................................... 82/21 B

[56] References Cited
U.S. PATENT DOCUMENTS

| 2,172,999 | 9/1939 | Hoelscher | 82/21 B |
| 2,907,224 | 10/1959 | Cafolla | 82/21 B |
| 3,224,070 | 12/1965 | Cunningham | 82/21 B |

Primary Examiner—Harrison L. Hinson
Attorney, Agent, or Firm—Lewis H. Eslinger

[57] ABSTRACT

The specification discloses a lathe incorporating automatic feed at fast and slow speeds for driving (a) a tool holder carriage rapidly in leftward and rightward directions along the lathe bed and slowly in a leftward direction for automatic feed, and also (b) for rapid movement of the lathe cross-slide forwardly and rearwardly across the bed and slow movement of said cross-slide in the forward direction. In order to minimize the time taken for transition from slow to rapid speed in the automatic feed mechanisms, two parallel drive trains (one fast and one slow) are arranged to be selectively clutched to a main drive means for driving the tool holder carriage along the bed and for driving the cross-slide across the bed relative to the carriage.

6 Claims, 15 Drawing Figures

FIG.1
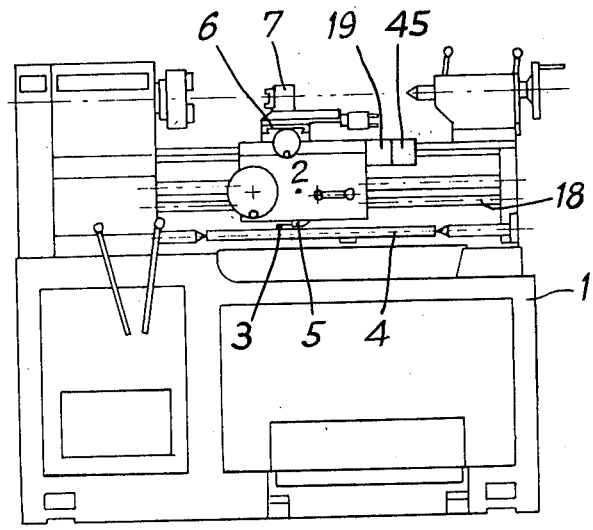
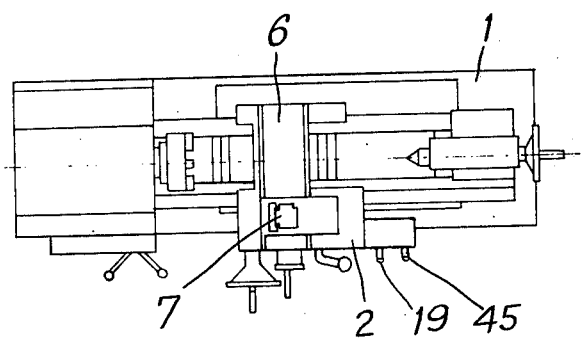
FIG.2

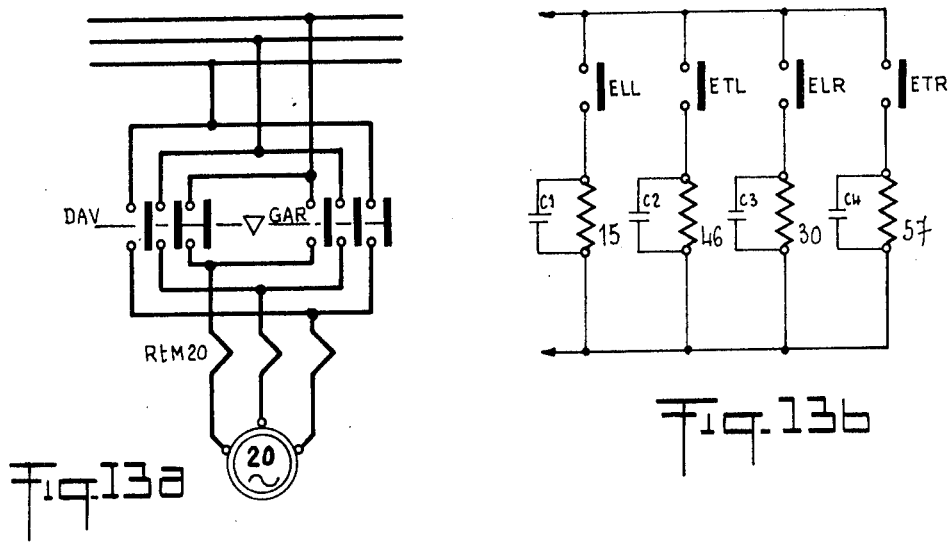
Fig.13a
Fig.13b
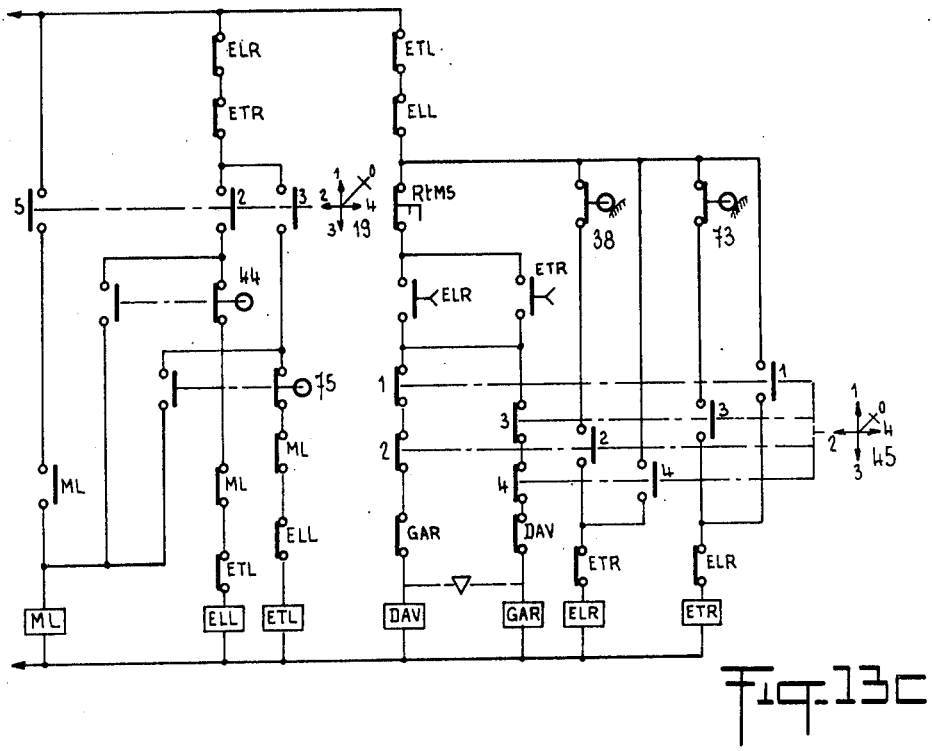
Fig.13c

AUTOMATIC FEED FOR A LATHE

The present invention relates to a device for controlling slow and rapid advances of lathe tool holders.

For turning workpieces on a lathe, it is important to reduce the machining time while maintaining a high precision of machining.

In known machines, control of the tool holder carriage for slow and rapid advance is obtained by means of a single motor device with a relatively complex and important drive train which permits, by a change of speed of the entire train, transition from slow advance to rapid advance and vice versa. However, such an apparatus requires the putting into motion of a considerable number of mechanical members for obtaining rapid displacement of the carriage, and this results in a loss of working time.

It is an object of the present invention to overcome this disadvantage.

In accordance with the present invention there is provided a lathe including a tool holder; means for driving the tool holder with respect to the lathe bed; a power drive train for slow speed movement, said slow speed drive train including the tool holder carriage guide bar which is connected by a solenoid operated clutch and an assembly of pinions to the said tool holder driving means on the tool holder carriage for slow speed movement of the tool holder when said clutch is engaged, a power drive train for rapid movement of said tool holder, said rapid drive train including a rapid drive motor driving a shaft which is connected by a second solenoid-operated clutch and a second assembly of pinions to the said tool holder driving means; an electric circuit connecting the solenoid of the first-mentioned clutch to a controller for slow carriage advance and to a limit switch interrupting energisation of said solenoid operating the first-mentioned clutch, and connecting the solenoid of the second clutch to a controller for rapid carriage advance by way of a switch which is arranged to be actuated at the limit of travel to interrupt energisation of the solenoid of the said second clutch.

The device of the present invention thus enables the tool holder carriage to be driven by respective means for slow advance and means for rapid advance. Thus the device in accordance with the invention presents the advantage of only accelerating simultaneously a very small number of mechanical members for obtaining rapid displacements of the tool holder in four directions, contrary to the more general case using purely mechanical solutions.

Furthermore, the device comprises means for automatic clutches for longitudinal and transverse displacements which select separately the slow and fast movements of the tool holder.

In order that the present invention may more readily be understood, the following description is given of one embodiment, with reference to the accompanying drawings, in which:

FIG. 1 is a front elevational view of a lathe in accordance with the present invention;

FIG. 2 is a top plan view of the lathe illustrated in FIG. 1;

FIGS. 13a to 13c are electric circuit diagrams showing the connection of the high speed motor with the different speed transmission trains.

Figure 3:
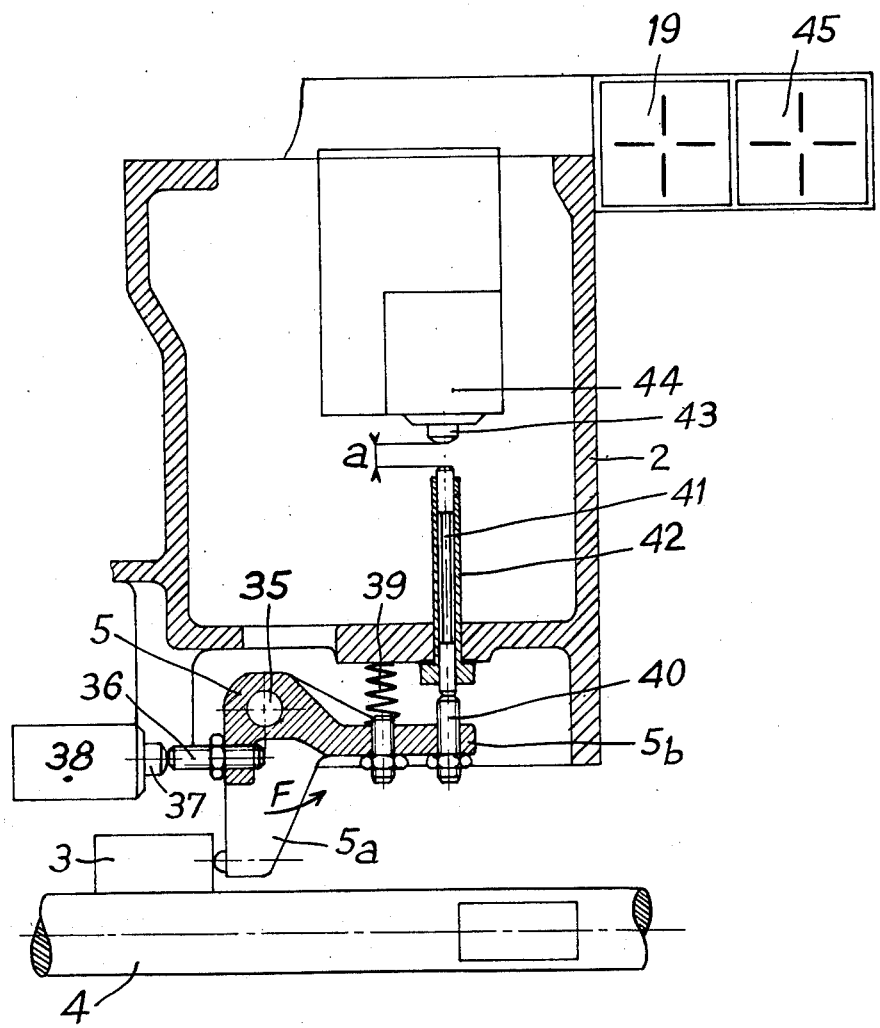
FIG. 3 is a longitudinal sectional view of the lower part of the platform of the feed carriage showing the stop members limiting longitudinal displacement.

In FIGS. 1 and 2, there is shown a parallel lathe, of known type, comprising a bed 1 on which is longitudinally slidably mounted a feed carriage 2 whose movement leftwards is limited by an automatic stop comprising a series of abutments 3 positioned on a barrel 4 rotatable in order to bring a different one of the abutments 3 into register with a common trip lever 5 fixed to the feed carriage 2 for selecting predetermined travel lengths of the feed carriage movement as desired. The feed carriage 2 supports a slidable cross-slide 6 which carries the tool holder 7.

Figure 4:
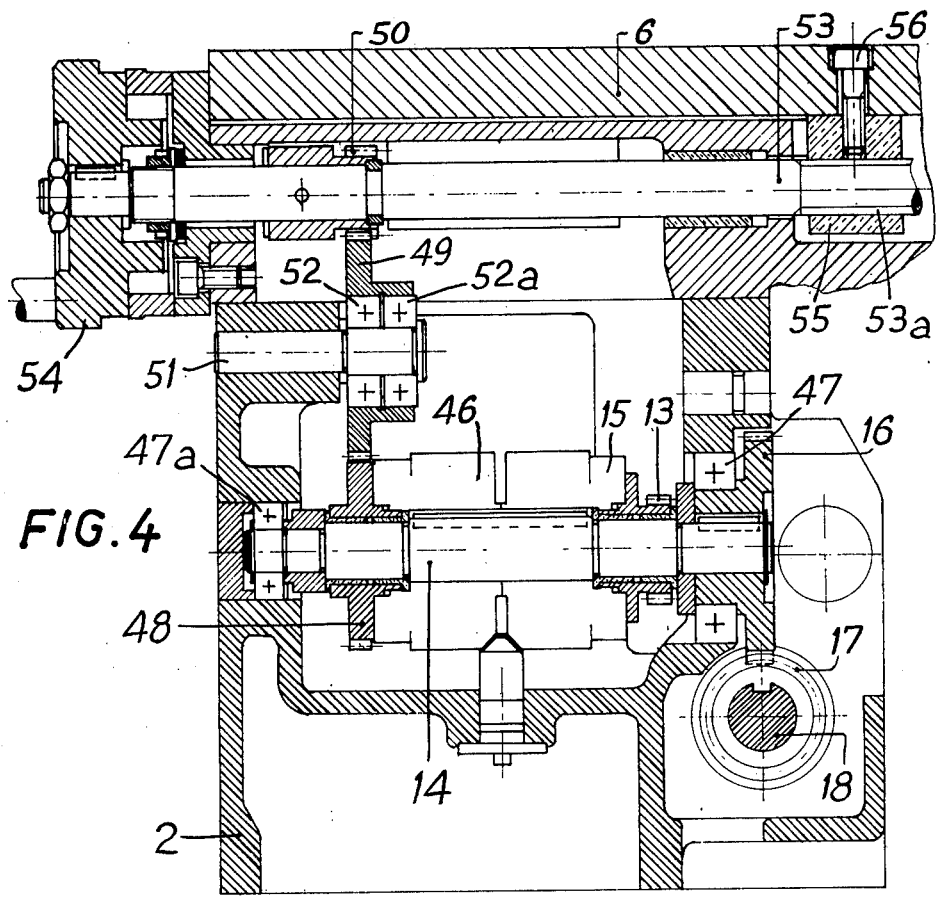
FIG. 4 is a transverse section of the feed carriage and the cross-slide.
Figure 5:
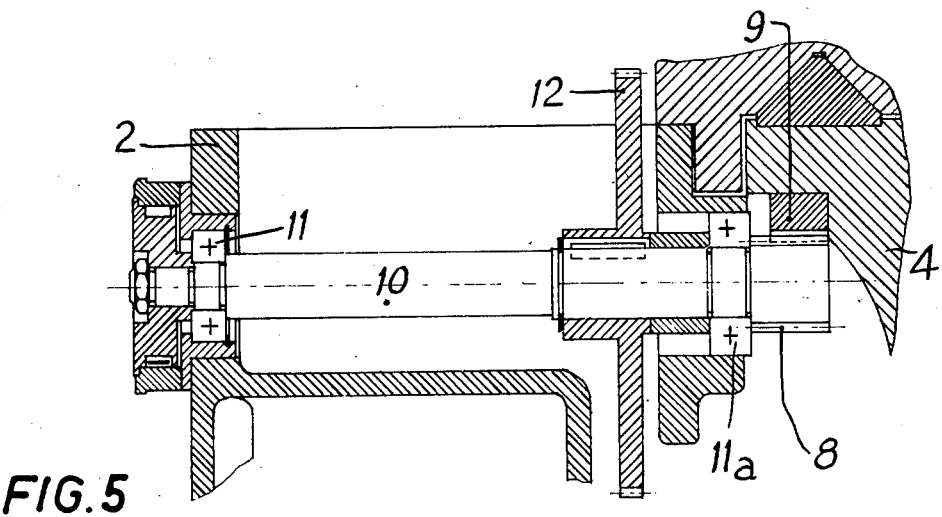
FIG. 5 is a sectional view of part of the drive train of the feed carriage.
Figure 11:
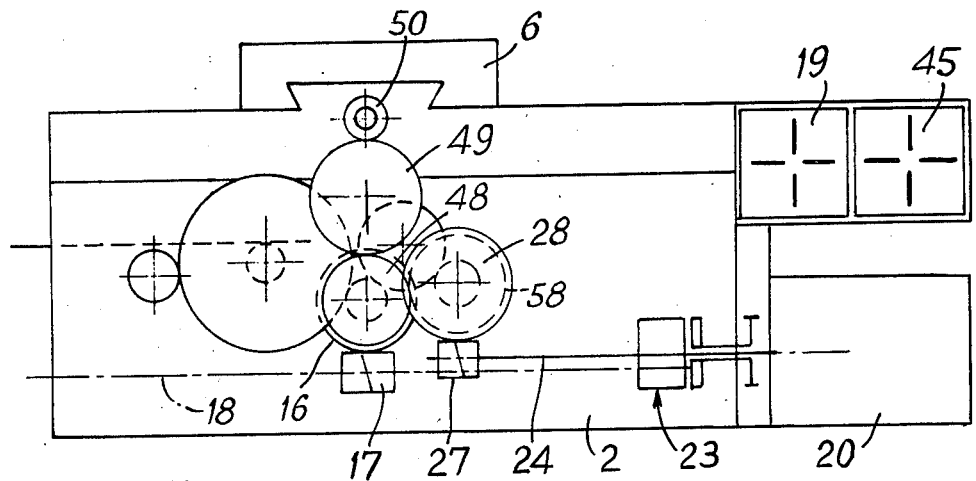
FIG. 11 is a schematic view in elevation, showing the drive train of the cross-slide.
Figure 12:
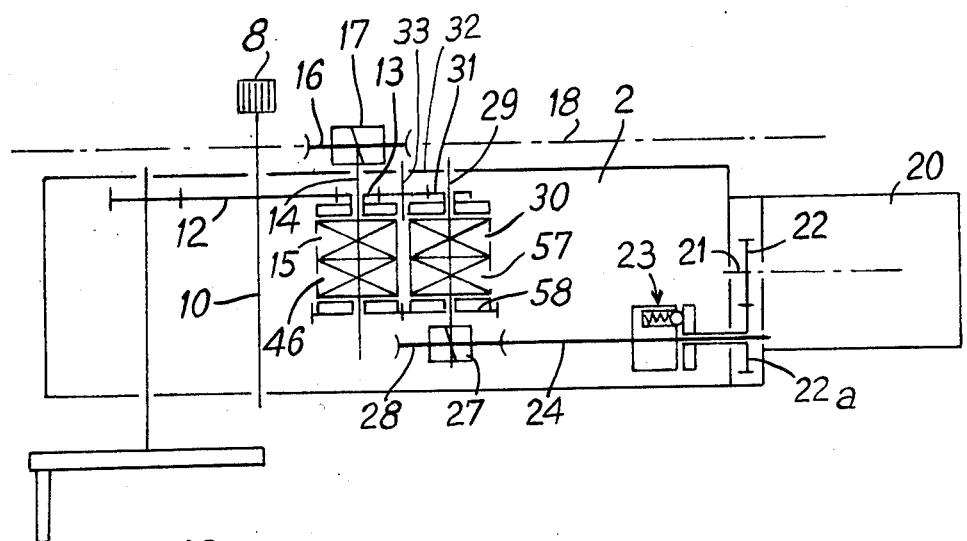
FIG. 12 is a schematic plan view showing the drive trains of the feed carriage.

In accordance with the invention, the feed carriage 2 (FIGS. 4, 5 and 12) is provided with a pinion 8 which meshes with a rack 9 fixed on the lathe bed 1 in such a manner that the rotation of the pinion 8 drives the feed carriage 2 for longitudinal displacement relative to the bed 1. The pinion 8 is keyed on a shaft 10, supported for rotation by means of bearings 11 and 11a on the feed carriage, said shaft 10 carrying a gear wheel 12 which is keyed thereto and meshes with a gear wheel 13 freely rotatably mounted on a shaft 14 itself rotatably mounted by means of bearings 47 and 47a on the feed carriage. This gear wheel 13 is fixed to the driven shaft of an electromagnetically controlled clutch device 15 the driving shaft of which is fixedly connected to the shaft 14 on which is keyed a helical gear wheel 16 meshing with a worm wheel 17 fixedly carried by a rotatable carriage drive bar 18 actuated by known means. This mechanism makes it possible to assure longitudinal displacement of the feed carriage 1 at a slow speed, by actuation of the clutch device 15 using a known form of controller 19 of "self latching" type (FIGS. 1, 3 and 11) fixed on the platform of the feed carriage. The automatic limiting of the travel at the left-hand end of the feed carriage is controlled by a trip lever 5 (FIG. 1) which cooperates with one of the above-mentioned stops 3 in a manner which will be described later.

Furthermore, there is provided on the platform of the feed carriage (FIG. 1) a drive mechanism for rapid advance, driven in parallel with the above described drive train for slow advance. This rapid advance mechanism comprises an electric motor 20 (FIGS. 9, 10, 11, 12) of which the output shaft 21 is connected, by a pair of pinions 22, 22a and a ball-type of torque limiting clutch of known design, to a shaft 24 mounted rotatably by means of bearings 25, 25a in a sleeve 26 fixed to the feed carriage 2. A worm wheel 27 is force-fitted on the shaft 24 and meshes with a helical pinion 28 which is keyed on a shaft 29 and connected to the driving side of an electromagnetically controlled clutch device 30 of which the driven side is connected to a pinion 31. This pinion 31 is freely rotatably carried by the shaft 29 and is connected to the pinion 13 by means of a gear wheel 32 mounted rotatably, by means of bearings 34, 34a, on a shaft 33 supported by the feed carriage 2.

This arrangement permits the transmission of rapid drive from the motor 20 to the pinion engaging the rack 9; when the clutch device 30 is actuated the movement is transmitted by the pinion 31 and the assembly of gear wheels 32, 13 and 12. Movement towards the left is interrupted in the case of slow advance, as with rapid advance, by the action of the stop 3 against trip lever 5. This trip member 5 (FIG. 3) which is pivotally mounted around a spindle 35 fixed to the feed carriage 2, comprises two arms 5a, 5b disposed perpendicularly to one another. One of these arms 5a is capable of contacting the preset stop 3 and carries an adjustable stud 36 which is held in contact, under the action of a spring 39, with a button 37 of a switch 38 in the electric power supply to the clutch member 30. The other arm 5b, on which the above-mentioned spring 39 bears, is provided with an adjustable stud 40 which bears against one of the ends of a pin 41 mounted slidably in a sleeve 42 fixed to the feed carriage 2. The other end of the pin 41 is positioned to abut a control button 43 of a switch 44 fixed to the feed carriage 2. When the arm 5a comes into contact with the appropriate stop 3 which will be the only one in line with arm 5a, the trip lever pivots about the spindle 35 in the direction of arrow F, it can produce two distinct actions according to which (a) the feed carriage is displaced for slow advance when the solenoid of the clutch device 15 (FIG. 4) is energised or (b) the feed carriage 2 is displaced for rapid advance when the solenoid of the clutch device 30 (FIG. 9) is energized.

In the case of slow advance, the switch is inactive due to the fact that its corresponding electric circuit is not energised, and that only the solenoid of clutch device 15 is energized by the controller 19. When the trip lever 5 pivots in the direction of arrow F, the stud 40 drives the sliding pin 41 and comes to bear against the button 43 of the switch 44 which cuts off feed to the clutch device 15 and arrests the slow longitudinal advance of the feed carriage 2.

In the case of rapid advance, energization of the solenoid of clutch member 30 is effected by actuating a self-latching controller 45 of known type (FIG. 3, 14) similar to the controller 19.

Once energization has been effected by means of the switch 38, the feed circuit is broken when the trip lever 5 pivots about the spindle 35 in the direction of arrow F against the action of the spring 39 causing the stud 36 to release the button 37 of switch 38 to open the circuit at this switch. This results in arresting of the rapid advance of the feed carriage. A free play a is provided between the end of the pin 41 and the button 43 of the switch 44 in order to allow for the inertia of the decelerating feed carriage 2, so that the pin 41 does not actuate the switch member 44 when the feed carriage 2 is slowing down after rapid advance.

An identical device is used for displacements of the cross-slide 6 relative to the tool holder carriage.

The transverse slow advance of the slide 6 (FIGS. 1, 4, 11) is obtained, as described above, due to the guide bar 18 carrying the force-fitted worm wheel 17 in mesh with the pinion 16 force-fitted on the shaft 14. This shaft 14 carries an electromagnetic clutch device 46 of which the driving part is connected to the shaft 14 and of which the driven part is fixed to a gear wheel 48 support for free rotation coaxially with respect to the shaft 14 and is connected to a pinion 50 through the agency of a gear wheel 49 carried, by means of bearings 52, 52a, on a shaft 51 fixed to the feed carriage 2.

The pinion 50 is fixed to a shaft 53 which is rotatably mounted on the feed carriage 2 and comprises at one of its ends a hand wheel 54 and at its other end a threaded portion 53a on which is engaged a nut 55 fixed by means of a screw 56 to the slide 6.

This arrangement makes it possible to ensure transverse displacement of the slide 6 at a slow speed, when the clutch device 46 is under drive, by actuating the controller 19 in order to obtain forward or backward displacements of the said slide.

Automatic arrest of the travel of the cross-slide 6 is obtained by means of a limit switch which will be described later. As in the case of the feed carriage 2, the cross-slide 6 is capable of being driven by a rapid drive train which is driven in parallel with the slow speed drive train.

The rapid transverse advance is obtained by means of the electric motor 20 (FIGS. 4, 8, 10, 11, 12) which, through the agency of torque limiter 23 the worm wheel 27 and the pinion 28 drives rotatably the shaft 29 which carries an electromagnetically controlled clutch device 57 of which the driving side is connected to the shaft 29 and the driven side is fixedly connected to a gear wheel 58 mounted for free rotation coaxially relative to the shaft 29. The gear wheel 58 is connected to the pinion 50 (FIG. 4) through the agency of the gear wheels 48 and 49 such that, apart from the motor 20, it is possible to use the pinion 50 to drive the shaft 53 and hence the cross-slide 6.

Figure 6:
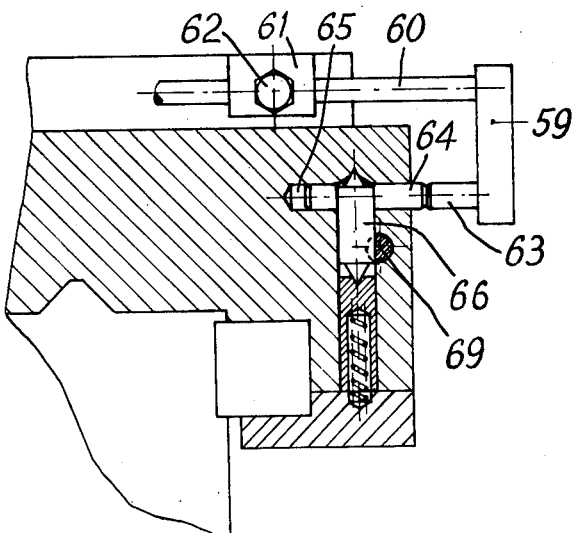
FIG. 6 is a transverse sectional view along the line VI—VI of FIG. 7.
Figures 7, 8:
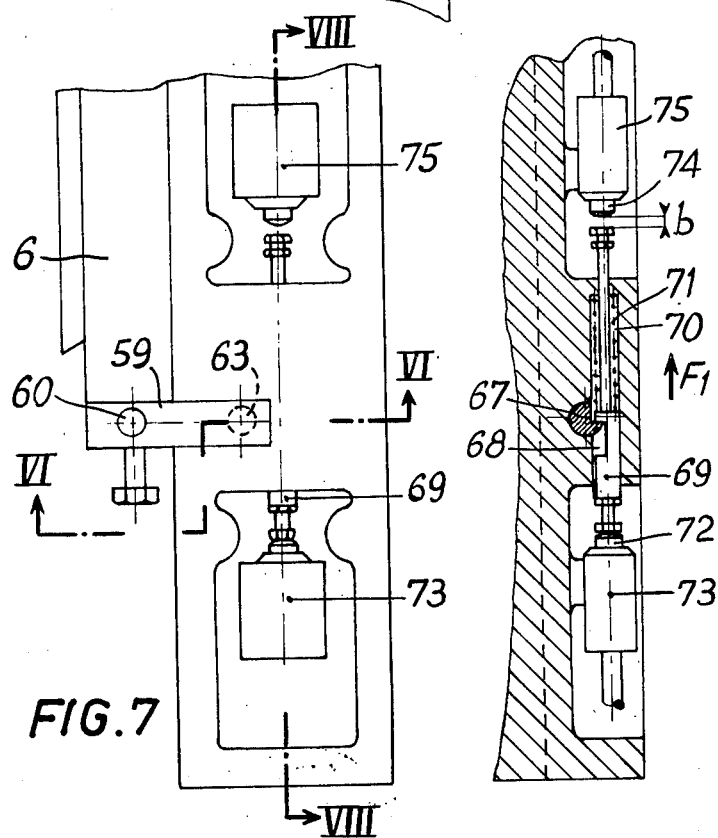
FIG. 7 is an elevation of a part of the feed carriage and of the slide.
FIG. 8 is a cross-section along the line VIII—VIII of FIG. 7.
Figure 9:
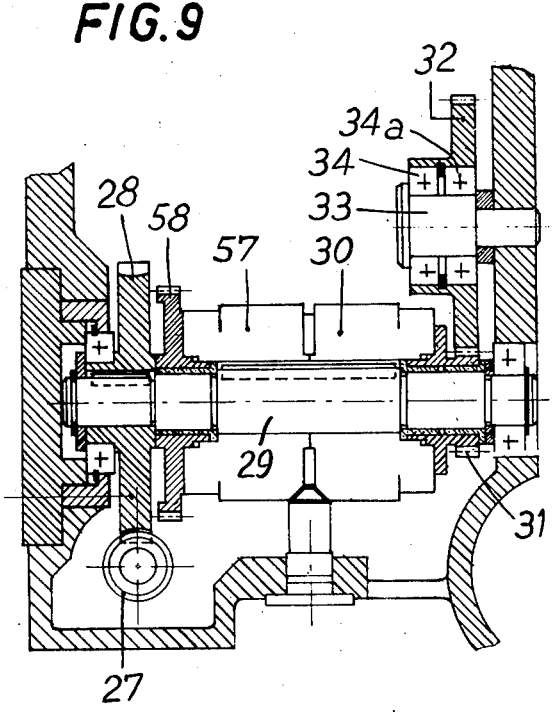
FIG. 9 is a transverse cross-section of the feed carriage showing the clutch devices for rapid advance.
Figure 10:
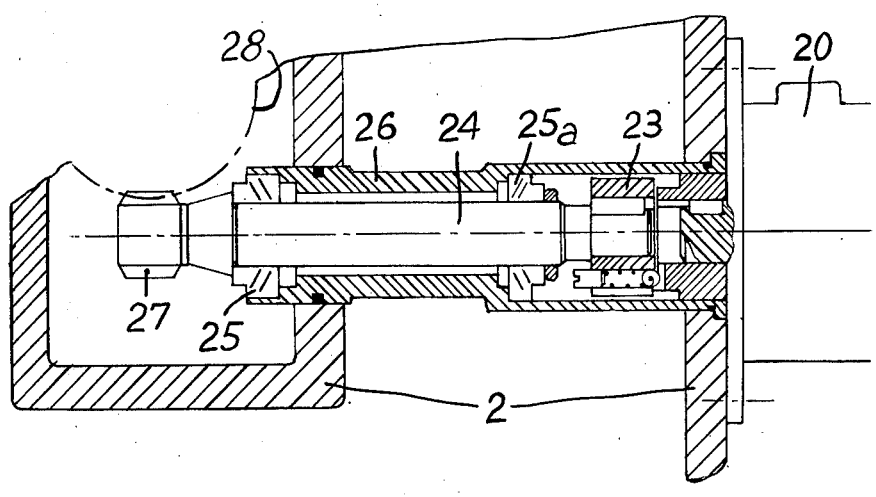
FIG. 10 is a cross-sectional view of the feed carriage in a condition in which the motor is driving the carriage at high speed.

This arrangement permits control of slow transverse advance of the cross-slide 6 by means of controller 19 energizing the solenoid of clutch device 46, and of rapid transverse advance by means of the controller 45 energizing the solenoid of clutch device 57. Automatic stopping of slow advance or rapid advance of the slide in the forward direction is obtained by means of the above-mentioned limit switch (FIGS. 6, 7 and 8). This limit switch has an abutment member 59 fixed in adjustable manner to the cross-slide 6 by a rod 60, a clamping member 61 and a locking screw 62, said abutment member 59 comprising a boss 63 capable of abutting, at the end of its movement against a plunger 64 which is mounted slidably in a bore 65 of the holder carriage 2 and which cooperates by means of a notch with a tumbler 66 presenting a catch 67 which can engage in a notch 68 of a pin 69 mounted slidably in a bore 70 of the carriage 2.

One end of the pin 69 is in abutting engagement, under the action of a spring 71, with a control button 72 of a switch 73 which controls energization of the clutch device 57. The other end of the sliding pin 69 is capable of contacting a control button 74 of a switch 75 controlling energization of the clutch device 46.

In the case of a slow transverse advance of the cross-slide, the switch 73 does not operate, due to the fact that the corresponding electric circuit is not energized, even though the switch may be held in closed position under the action of the spring 71. When the boss 63 of the abutment 59 engages the plunger 64 at the end of travel, the plunger 64 rotates the tumbler 66 to cause the catch 67 of the tumbler, during pivoting to push the pin 69 in the direction of the arrow $F_1$ against the spring 71 and to bring one of its ends into contact with the button 74 of the switch 75 to cut energization of the clutch device 46 and arrest the slow transverse advance of the cross-slide 6.

In the case of a rapid advance, energization of the clutch device 57 is effected by operating the controller 45 while the switch member 73 is held in its closed position by the spring 71. As soon as the abutment 59 engages the plunger 64 to rotate tumbler 66, the sliding pin 69 will be driven in the direction of the arrow $F_1$ against the action of the spring 71 to bring that end of the pin 69 which is in engagement with the button 72 away from the button allowing the switch 73 to open circuit, resulting in de-energization of the clutch device 57 and arresting of the rapid advance of the cross-slide 6.

A free play *b* is provided between the end of the pin 69 and the button 74 of the switch 75, in order to take into account the inertia of the cross-slide 6 so that the pin 69 will not actuate the switch 75 when the cross-slide is slowing down from a rapid advance movement.

FIGS. 13a to 13c show a circuit diagram for the motor 20 for rapid advance, and for the different clutch devices 15, 46, 30 and 57. From these diagrams it will be appreciated that the clutch devices 15, 46, 30 and 57 are all electromagnetic clutches.

The controllers 19 and 45 control, respectively, slow advance and rapid advance of the lathe tool holder carriage 2. They have a central rest position 0 and four positions at 90° intervals for controlling the different movements. Positions 2 and 3 (FIG. 13c) of the controller 19 are the only ones which are self-latching and are for slow longitudinal leftward advance (position 2) and slow transverse forward advance (position 3). In these two stable positions, the movement will continue in the absence of intervention on the hand lever, although of course the lever can at any instant be brought to position 0 for stopping the advance. If the hand lever can stay in the self-held position, it is sufficient to place the stop 3 of the barrel 4 (FIG. 3) in a predetermined position for obtaining automatic declutching of the advance. The operator must return the handle to position 0 after declutching.

The other positions 1 and 4 of the controller 19 and all four positions of the controller 45 are 37 live," that is to say the control handle will return automatically to position 0 once the operator frees the handle. Rapid advances initiated by the controller 45 (FIG. 13c) will thus stop immediately the lever is released. On the other hand, rapid leftward longitudinal advances and rapid transverse advances are obtained respectively by positions 2 and 3 of controller 45, and will be stopped only at the end of travel by means of declutching of the platform controlled by a stop 3 of the barrel 4, provided the operator holds the lever in position.

For obtaining slow longitudinal advance of the tool holder carriage, the controller 19 must be manipulated to position 2 and the switch 5 must be closed. This provides energization of the relay ELL and of the clutch device 15 (FIG. 13b) which controls slow longitudinal advance.

If position 2 of the controller 19 is held, the movement proceeds as far as tripping of the lever 5 and the switch 44. The relay ML (FIG. 13c) constituting the movement memory, stays held on unless the controller 19 is returned to position 0.

For obtaining slow transverse advance of the cross-slide 6 of the lathe, the controller 19 is actuated to "live" position 3, the switch 5 is closed, thus energizing the relay ETL and the clutch device 46 (FIG. 13b) which controls slow transverse advance. If the position 3 of the controller 19 is self-holding, the movement proceeds until the switch 75 (FIG. 13c) operates.

The relay ML, constituting the movement memory, stays held on provided the controller 19 is not returned to position 0.

For obtaining rapid longitudinal advance of the tool holder carriage 2 towards the left, the controller 45 is actuated to position 2 which energizes the relay ELR and the clutch 30 controlling rapid longitudinal advance. The delayed switch ELR ensures rotation of the motor 20 (FIG. 13a) for rapid advance through the agency of switch GAR. The movement is arrested by return of the controller 45 to position 0 or by breaking the circuit at switch 38 (FIG. 13c).

For obtaining rapid longitudinal advance of the lathe tool holder carriage in a rightward direction the controller 45 is actuated to position 4 thus provoking energization of the relay ELR and of the clutch device 30 (FIG. 13b) which controls rapid longitudinal advance. The delayed switch ensures rotation of the motor 20 for rapid advance through the intermediary of switch DAV, the movement being stopped by placing the controller to position 0.

For obtaining rapid transverse advance of the slide in a forward direction the controller 45 is actuated to position 3 thus provoking energization of the relay ETR and of the clutch 57 controlling rapid transverse advance. The delayed switch ETR ensures rotation of the motor 20 for rapid advance through the agency of switch DAV. The movement is stopped by placing the controller 45 to position 0 or by breaking the circuit at switch 73 (FIG. 13c).

For obtaining rapid transverse advance of the slide in a rearward direction the controller 45 is manipulated to position 1, thus provoking energization of the relay ETR and of the clutch device 57 which controls rapid transverse advance. The delayed switch ETR ensures rotation of the motor 20 for rapid advance through the agency of the switch GAR. The movement is stopped by placing the controller to position 0.

Positions 1 and 4 of the controller 19 are reserved, on the lathe, for rotating the tailstock forwardly or rearwardly under automatic feed conditions. It will not normally be necessary for the tool holder to be moved longitudinally rightwardly or transversely rearwardly at slow speed under conditions of automatic feed so the positions 1 and 4 of controller 19 will not be needed for the tool holder platform.

Of course several modifications can be included by the workmen in the art, to the devices and processes which have just been described, solely for the purpose of non-limiting example, without departing from the scope of the invention as defined by the following claims.

We claim:
1. A lathe including:
a bed;
means for mounting a workpiece for rotational movement about an axis extending along said bed;
a tool holder carriage mounted for movement along said bed in a direction parallel to said axis;
a tool holder cross-slide mounted for movement relative to said tool holder carriage in a direction extending transversely of said bed;

a tool holder supported by said tool holder cross-slide;

means for driving said tool holder with respect to said bed;

first drive propulsion means operable to drive said tool holder driving means at a slow speed of movement, said first drive propulsion means including a guide bar extending along said bed for guiding said tool holder carriage, a first gear train engageable with said guide bar and carried by said tool holder carriage, first clutch means operable to connect said first gear train to said tool holder driving means, and a first solenoid actuatable to engage said first clutch means;

second drive propulsion means operable to drive said tool holder driving means for rapid movement of said tool holder, said rapid drive propulsion means including a drive motor carried by said tool holder carriage, a second gear train carried by said tool holder carriage and operably connected to be driven by said motor, second clutch means engageable to connect said second drive propulsion means with said tool holder driving means, and a second solenoid actuable to engage said second clutch means;

first control means for selecting slow driving movement of said tool holder driving means;

a first electric circuit connecting said first solenoid to said first control means;

a first switch means in said first electric circuit effective to interrupt energization of said first solenoid;

second control means for selecting rapid driving movement of said tool holder;

second switch means for interrupting energisation of said second solenoid;

and a second electric circuit connecting said second solenoid to said second switch means.

2. A lathe as set forth in claim 1, and including a trip lever pivotally mounted on said tool holder carriage; first and second perpendicular arms to said trip lever; and a barrel fixed to said bed and carrying a plurality of stops which, by rotation of said barrel, are selectively positionable to engage said first arm, and said first switch means including a first limit switch positioned to be engaged by said second arm when said first arm strikes one of said stops.

3. A lathe as set forth in claim 2, and including a pin slidably mounted on said tool holder carriage between said second arm and said first limit switch, whereby said second arm slides said pin to drive said pin into a position of cooperation with said first limit switch.

4. A lathe as set forth in claim 2, wherein said second switch means includes a second limit switch mounted adjacent said first arm, and including resilient biasing means for holding said first arm in engagement with said second limit switch until said first arm contacts said one of the stops carried by said barrel.

5. A lathe as set forth in claim 1, wherein said means for driving the tool holder comprise first driving means for driving said tool holder carriage along said drive bar, and second driving means for driving said tool holder cross-slide across said carriage.

6. A lathe as set forth in claim 5, and including means defining a bore in said tool holder carriage; a plunger mounted in said bore; a stop arranged to contact said plunger; means for adjusting the positioning of said stop relative to said carriage at the instant of contact between said stop and said plunger; a tumbler mounted for rotation within said carriage; means defining a first notch in said tumbler for cooperation with said plunger for rotation of said tumbler when said plunger and tumbler come into contact; means defining a second bore in said carriage; a pin slidably mounted in said second bore of said carriage; means defining a second notch in said pin for engagement with said first notch of said tumbler; a third limit switch controlling energisation of said second solenoid; means spring-biasing said pin for holding one end of said pin against said third limit switch, and a fourth limit switch arranged to energise said first clutch means said fourth limit switch being positioned for engagement with an end of said pin.

* * * * *